US005535608A

United States Patent [19]

Brin

[11] Patent Number: 5,535,608

[45] Date of Patent: Jul. 16, 1996

[54] DEVICE FOR UNLOCKING AND LOCKING TO SPACED APART TILTING HOODS OF A MOTOR VEHICLE

[75] Inventor: Constantin Brin, Stuttgart, Germany

[73] Assignee: Dr. Ing. h.c.F. Porsche AG, Weissach, Germany

[21] Appl. No.: 295,462

[22] Filed: Aug. 25, 1994

[30] Foreign Application Priority Data

Sep. 4, 1993 [DE] Germany .......................... 43 29 997.0

[51] Int. Cl.$^{6}$ .................................................... B60R 25/00

[52] U.S. Cl. ................................ 70/256; 70/224; 70/199; 70/239; 292/DIG. 25; 292/DIG. 14; 292/DIG. 43

[58] Field of Search .............................. 70/103, 113, 198, 70/199, 224, 14, 239, 256, 257; 292/35, 36, 38, 40, 100, 166–168, 171, 141, 225, 226, DIG. 3, DIG. 5, DIG. 14, DIG. 16, DIG. 25, DIG. 21, DIG. 30, DIG. 43

[56] References Cited

U.S. PATENT DOCUMENTS

| | | | |
|---|---|---|---|
| 1,674,315 | 6/1928 | Blossom et al. | 70/257 |
| 2,084,045 | 6/1937 | Olsen | 292/171 |
| 2,548,242 | 4/1951 | Rosenbarger | 292/171 |
| 4,003,227 | 1/1977 | Casey | 70/14 |
| 4,459,834 | 7/1984 | Seki | 292/DIG. 25 |
| 4,875,350 | 10/1989 | Faust | 70/257 |
| 4,912,950 | 4/1990 | Crowle | 292/DIG. 38 |
| 4,951,486 | 8/1990 | Braun et al. | 70/208 |

FOREIGN PATENT DOCUMENTS

| | | | |
|---|---|---|---|
| A760914 | 3/1934 | France . | |
| 2642745 | 4/1978 | Germany | 70/239 |
| 3807987A1 | 10/1988 | Germany . | |
| 2039319 | 8/1980 | United Kingdom . | |

*Primary Examiner*—Darnell M. Boucher

*Attorney, Agent, or Firm*—Evenson McKeown Edwards & Lenahan

[57] ABSTRACT

An automobile with a body passenger compartment open at the top has two tilting hoods located at a distance from one another, with each hood being provided with a lock that is connected by a connecting element with an operating handle of an operating device. Both hoods are unlockable from the passenger compartment. Provision is made such that both operating handles are associated with a common operating device, which comprises a bearing housing with a central cylinder lock. Molded notches on both operating handles cooperate with outside walls of the lock housing of the cylinder lock.

27 Claims, 4 Drawing Sheets

DEVICE FOR UNLOCKING AND LOCKING TO SPACED APART TILTING HOODS OF A MOTOR VEHICLE

BACKGROUND AND SUMMARY OF THE INVENTION

The invention relates to a device for unlocking and locking at least two spaced apart tilting hoods of an open top motor vehicle, operable from inside the vehicle passenger space.

In a known motor vehicle of the type referred to above (Porsche 911 Cabrio), a device for unlocking from the passenger compartment is provided for a first hood located in the front area and a second hood provided in the rear area, with a separate operating device with an operating handle being provided in the passenger compartment for each hood. The operating device for the front hood is mounted on the inside of the A pillar, while an operating device for the rear hood is mounted on the B pillar. The operating device for the rear hood is only accessible when the side door of the vehicle is open, so that when the vehicle is open and the vehicle side door is closed, the rear hood cannot be unlocked by unauthorized persons.

An object of the invention is to improve a device for unlocking and locking at least two spaced apart tilting hoods of a preferably open automobile in such fashion that it is economical to manufacture with a simplified design and also offers effective protection against theft when the vehicle is open.

This object is achieved according to the invention by an arrangement with each hood having a locking passenger compartment that is open at the top, with each hood having a lock that is connected by a connecting element with an operating handle of an operating device, and both hoods being unlockable from the passenger compartment, wherein both operating handles are associated with a common operating device which comprises a bearing housing with a central cylinder lock having a lock housing and a lock cylinder movable therein, molded notches of both operating handles being in an operating relationship with outside walls of the lock housing of the cylinder lock.

The primary advantages achieved with the invention consist in the fact that by providing a common operating device with a central cylinder lock for the actuating handles of both hoods, a device is created that is simple in design and economical, with effective protection against unauthorized unlocking of the two hoods when the vehicle is open being provided when the lock cylinder is locked.

With the lock cylinder locked, molded notches on the two operating handles positively engage the outer sides of the lock housing, so that the operating handle cannot be moved into an operating position. With the lock cylinder unlocked, the spring-loaded lock housing moves outward automatically, causing the notches of the operating handle to cooperate with depressed recesses in the lock housing, thus permitting tilting of the operating handle and hence unlocking of the hoods.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
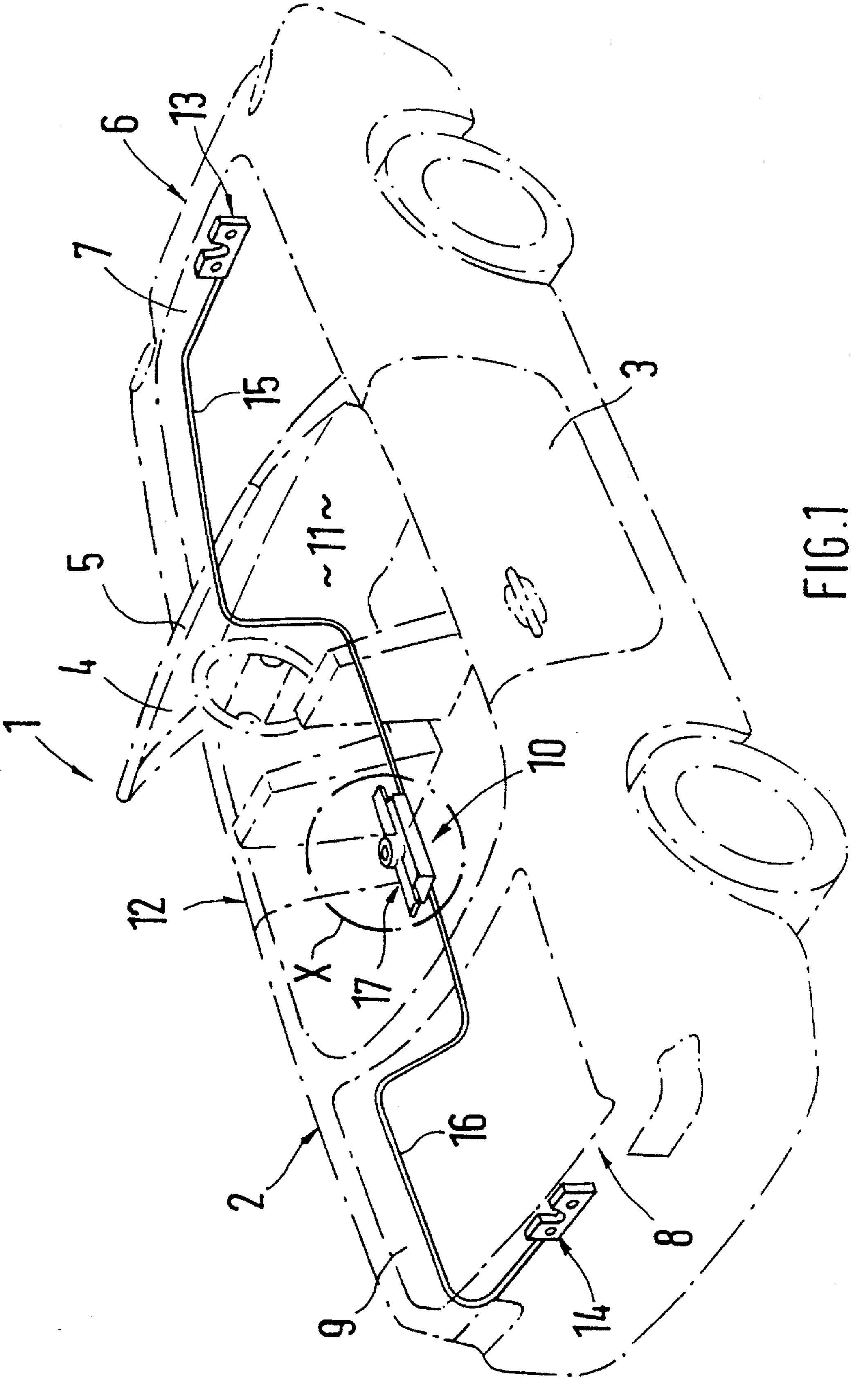
FIG. 1 is a perspective view, looking diagonally from the rear, at an automobile with a body that is open at the top and a device for unlocking and locking at least two hoods that are spaced apart, constructed according to a preferred embodiment of the invention.

FIG. 1 shows an automobile 1 whose body 2 has side doors 3, a windshield frame 5 receiving a windshield 4, a first hood 7 located in the front area 6 as well as a second hood 9 provided in rear area 8. A device 10 is provided for unlocking and locking the two tilting hoods 7, 9, said device being operable from a passenger compartment 11 of automobile 1, which is preferably designed to be open above a belt line 12. Each hood 7, 9 has a conventional lock 13, 14 associated with it, each lock 13, 14 being connected by a connecting element 15, 16 with a common operating device 17. Connecting elements 15, 16 are formed by Bowden cables in the embodiment shown. However, the connecting elements also can be designed as rods or the like according to other contemplated embodiments of the invention.

Figure 2:
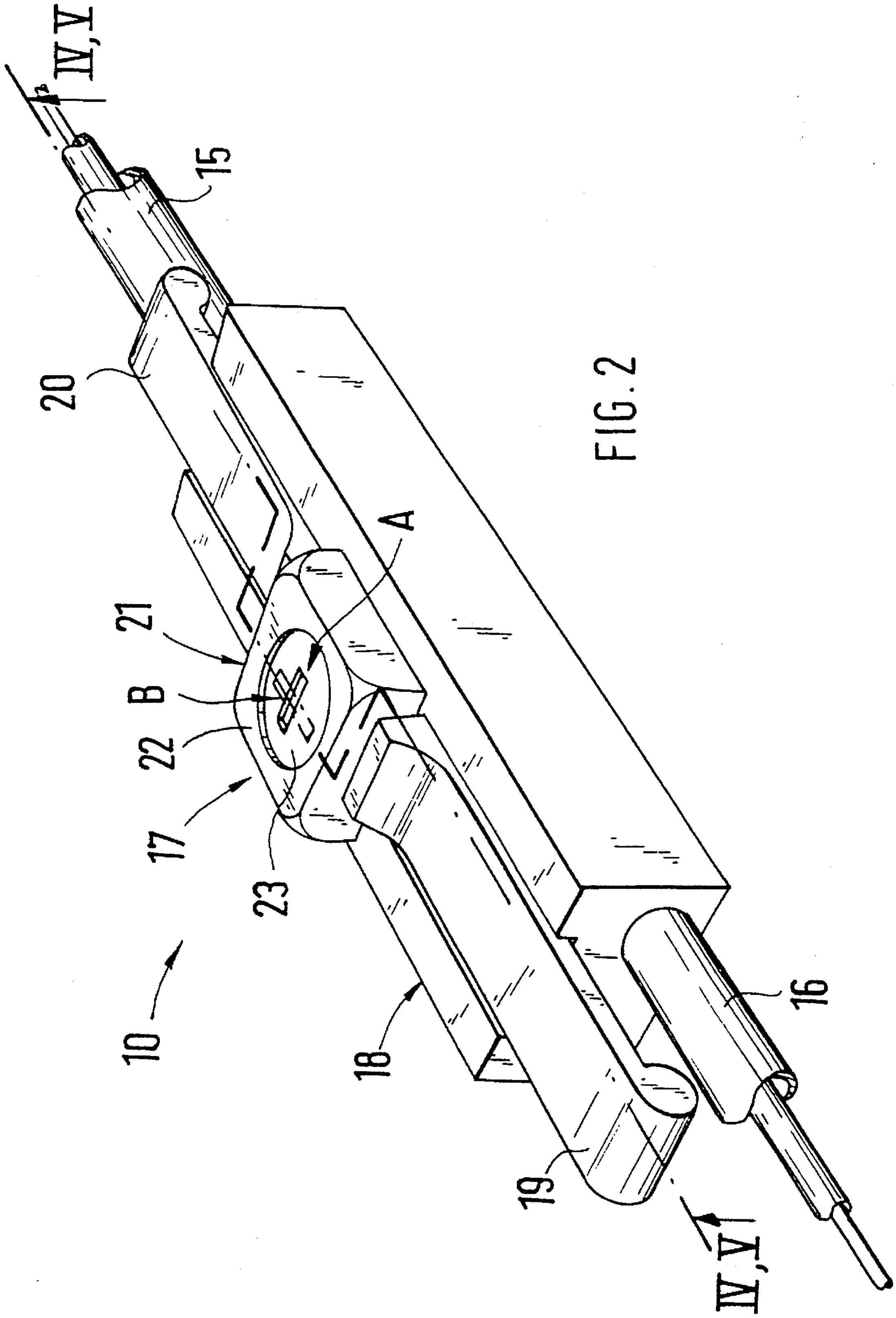
FIG. 2 is a detail X of FIG. 1 on an enlarged scale.

Common operating device 17 is mounted on the inside of a lengthwise member located laterally on the outside (sills) or on the drive tunnel, and comprises an elongated bearing housing 18 that receives operating handles 19, 20 for hoods 7, 8 and a central cylinder lock 21 (FIG. 2).

Cylinder lock 21 is located in a central area along the length of bearing housing 18 and comprises a lock housing 22 and a lock cylinder 23 accommodated in lock housing 22. The lock cylinder 23 is movable by means of a key, not shown in greater detail, from a locking position A to an unlocking position B and vice versa. The ignition key is preferably used as the key, which can also be used for all other locking devices on the vehicle (glove box, doors, trunk), so that all locking devices can be operated with a single key.

Figure 3:
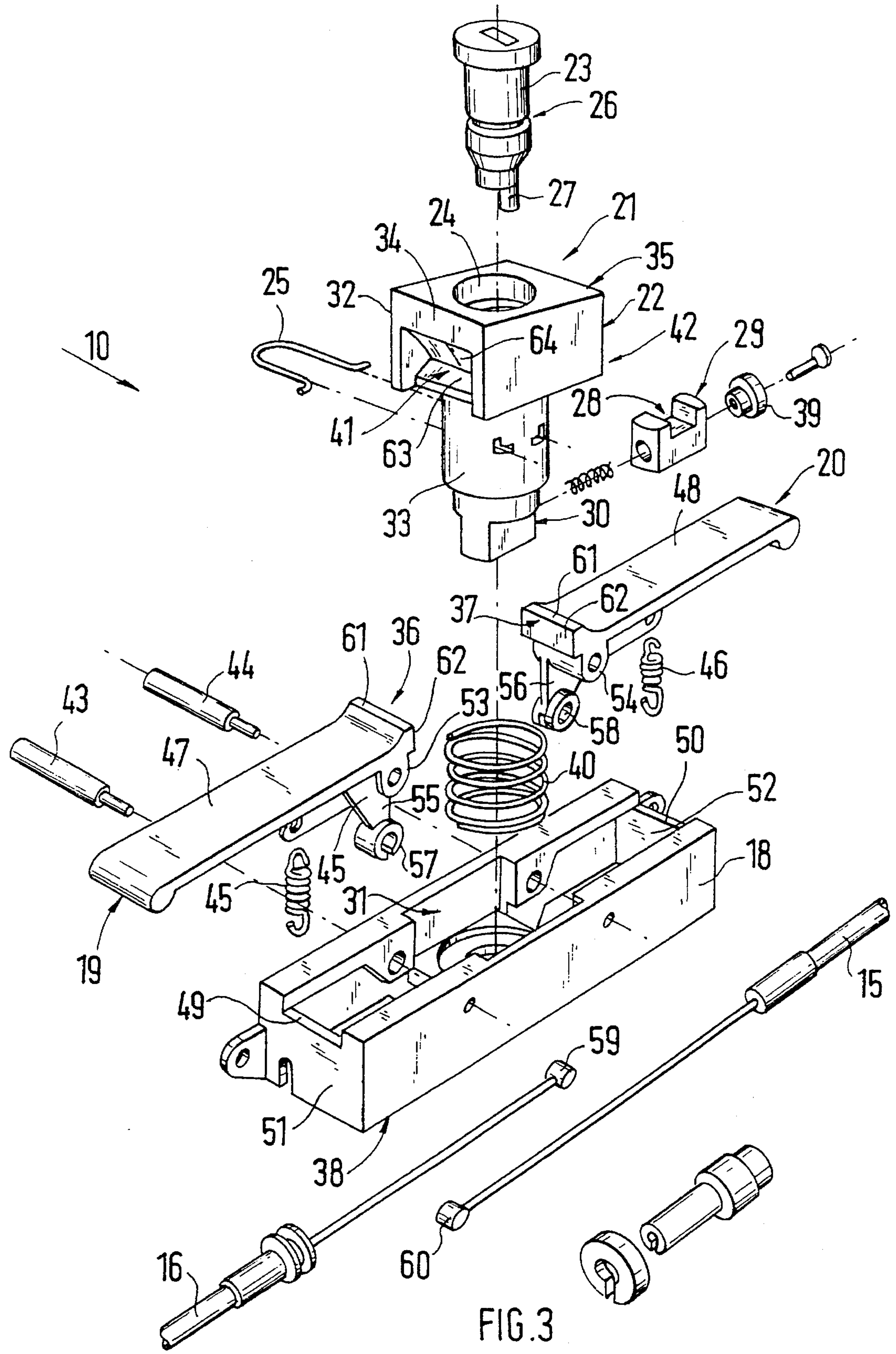
FIG. 3 shows the individual parts of the device for unlocking and locking in an exploded view.

According to FIG. 3, lock cylinder 23 is accommodated in a cylindrical opening 24 of lock housing 22 and is held in the axial direction by a spring-loaded retaining clip 25. Retaining clip 25 cooperates positively with an annular groove 26 in lock cylinder 23. Bent end segments of U-shaped retaining clip 25 are passed through recesses in lock housing 22 and project beyond lock housing 22. At its lower end, lock cylinder 23 has a shaped projecting eccentric 27, which cooperates with a recess 28 located below in a spring-loaded displaceable locking element 29. Spring-loaded locking element 29 is displaceably mounted in a recess 30 of lock housing 22 (in the direction of the length of bearing housing 18). Lock housing 22 is accommodated in a corresponding receiving opening 31 of bearing housing 18 and comprises a first area 32, made roughly prismatic, abutted below by a second area 33 made cylindrical and segmented. The two operating handles 19, 20 extend adjacent to one another from opposite transverse outside walls 34, 35 of lock housing 22, with molded notches 36, 37 of operating handles 19, 20 having an operating connection with outside walls 34, 35 of lock housing 22.

Figure 4:
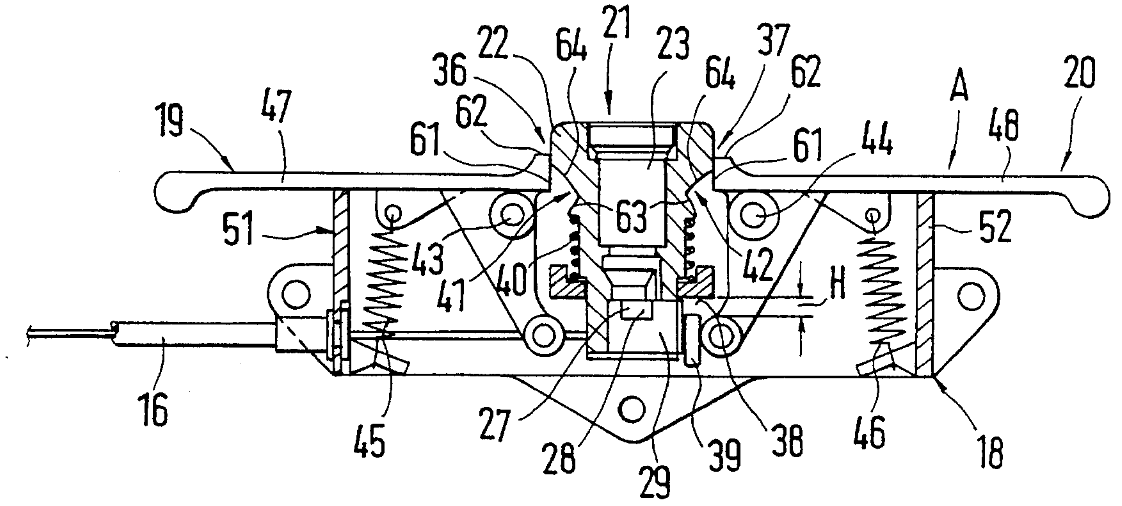
FIG. 4 is a section along line IV—IV in FIG. 2 with the cylinder lock locked.

When lock cylinder 23 is locked (locking position A; FIG. 4), spring-loaded locking member 29, cooperating with eccentric 27, grips beneath a bottom segment 38 of bearing housing 18 and notches 36, 37 of both operating handles 19, 20 abut the flat exteriors of outside walls 34, 35 of lock housing 22 positively, causing operating handles 19, 20 to be locked in their locking position A and not allowing them to tilt.

A roller 39 connected with locking member 29 by a bolt extends at a distance from bottom segment 38 located above.

Figure 5:
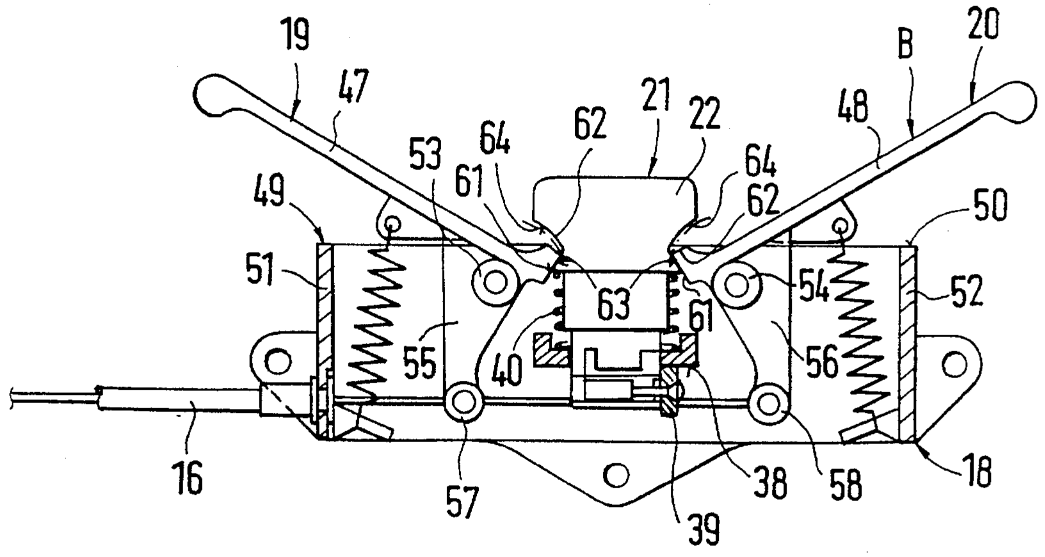
FIG. 5 is a section corresponding to FIG. 4 with the cylinder lock unlocked.

By a rotary movement of the key, inserted into lock cylinder 23 but not shown in greater detail, eccentric 27 is pivoted (FIG. 5), whereupon locking member 29 moves inward and out of engagement with bottom segment 38 of bearing housing 18. Lock housing 23 is moved in the axial direction by compression spring 40 surrounding it until roller 39 abuts the underside of bottom segment 38 (FIG. 5). Roller 39 thus limits the axial movement of lock housing 22, after lock cylinder 23 has been moved into its unlocking position.

In this unlocking position, as a result of axial displacement (travel H) of lock housing 22, notches 36, 37 of both operating handles 19, 20 cooperate with depressed recesses 41, 42 of lock housing 22 in such fashion that in this position, pivoting of one or both operating handles 19, 20 and hence unlocking of one or both hoods 7, 9 is made possible.

Recesses 41, 42 extend over a considerable portion of the width of the opposite outside walls 34, 35 of lock housing 22, with outside walls 34, 35 running transversely to the length of bearing housing 18 (FIG. 3).

The two operating handles 19, 20 are mounted pivotably on bearing housing 18 to pivot around rotary axes 43, 44 aligned transversely to the length of bearing housing 18. Rotary axes 43, 44 are formed by bolts, pins, or the like, with end segments being received in bearing housing 18. According to FIG. 3, rotary axes 43, 44 run adjacent to the outside walls 34, 35 of lock housing 22. Operating handles 19, 20 are connected by tangent springs 45, 46 with bearing housing 18. In locking position A of operating device 17, elongated gripping segments 47, 48 of operating handles 19, 20 run roughly parallel to the top of bearing housing 18, with handle segments 47, 48 resting segmentwise on recesses 49, 50 of side walls 51, 52 and projecting beyond bearing housing 18.

In the vicinity of rotational axes 43, 44, both operating handles 19, 20 have widened cross sections 53, 54. From these widened cross sections 53, 54, locally narrow upright ribs 55, 56 are guided downward which are provided endwise with cylindrical seats 57, 58 for end segments 59, 60 of connecting elements 15, 16.

The cylindrical end segments 59, 60 are inserted in seats 57, 58 in a manner similar to that used in bicycle brakes, with slit openings for the cable segments of the Bowden cables being provided at seats 57, 58.

Ribs 55, 56 and seats 57, 58 on the two operating handles 19, 20 are designed offset with respect to one another in the transverse direction.

According to FIGS. 2 and 3, front lock 13 is connected by connecting element 15 with operating handle 19, which is at the rear looking in the direction of travel, while rear lock 14 is connected by connecting element 16 to front operating handle 20. Connecting elements 15, 16 (Bowden cables) run inside bearing housing 18 and are spaced laterally apart from one another.

The projecting notches 36, 37 of operating handles 19, 20 are each formed by wall segments 61, 62 placed at right angles to one another, said segments being connected by stepped or rounded transitional areas to handle sections 47, 48 and expanded cross sections 53, 54.

Recesses 41, 42 provided on outside walls 34, 35 are each composed of a first lower section 63 running transversely and a second upper section 64 in the form of an arc, with both sections 63, 64 being at an angle to one another.

Wall section 61 of pivoted operating handle 19, 20 rests on first straight section 63, while second section 64 runs in such manner as to form a gap with wall segment 62 of notches 36, 37 (FIG. 5).

The radius application point of curved segment 64 is rotational axis 43, 44 of the respective operating handle 19, 20.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking system for first and second tilting hoods of a convertible automobile having an open top passenger compartment, said first and second tilting hoods being spaced from one another and from said passenger compartment, said locking system comprising:

a first locking latch engageable with the first tilting hood and movable between a locking and an unlocking position with respect to the first tilting hood, a second locking latch engageable with the second tilting hood and movable between a locking and an unlocking position with respect to the second tilting hood, a first movable handle which is operably connected to said first locking latch such that when said first handle is in a locking position, said first locking latch is held in its locking position, and when said first handle is in an unlocking position, said first locking latch is moved to its unlocking position, a second movable handle which is operably connected to said second locking latch such that when said second handle is in a locking position, said second locking latch is held in its locking position, and when said second handle is in an unlocking position, said second locking latch is moved to its unlocking position, and a common bearing housing supporting the first and second movable handles and containing a central cylinder lock having a lock housing and a lock cylinder movable therein, wherein each of said movable handles includes a notch engageable with the lock housing of the cylinder lock with said cylinder lock and lock housing holding the handles in their respective locking positions when said cylinder lock is in a locking position and such that said handles are released from their locking positions when said cylinder lock is moved to its unlocking position.

2. A locking system according to claim 1, wherein the notches of both operating handles positively abut exterior surfaces of outside walls of the lock housing to secure the operating handles in their respective locking positions when the lock cylinder is in the locking position.

3. A locking system according to claim 1, comprising a compression spring for pressing the lock housing towards its unlocking position, wherein the notches of both operating handles cooperate with recesses of the lock housing in such fashion that the operating handles can be pivoted to their unlocking positions when the lock housing is in said unlocking position.

4. A locking system according to claim 2, wherein the cylinder lock is operable by means of a key.

5. A locking system according to claim 4, wherein said key is a vehicle ignition key.

6. A locking assembly according to claim 5, wherein said key is also operable to operate other locking devices on a vehicle.

7. A locking system according to claim 1, wherein the operating handles are located on opposite sides of an upper area of the lock housing.

8. A locking system according to claim 1, wherein the lock cylinder has on its lower end an eccentric which cooperates with a spring loaded displaceable locking member, said locking member being displaceably mounted in a recess of the lock housing.

9. A locking system according to claim 8, wherein the locking member fits behind a bottom segment of the bearing housing when the cylinder lock is in the locking position.

10. A locking system according to claim 9, wherein a roller is mounted on the locking member, said roller limiting movement of the lock housing in such manner that the locking member abuts an underside of the bottom segment when the lock housing is moved upward by a compression spring.

11. A locking system according to claim 3, wherein each notch is formed by wall segments placed at substantially right angles to one another, said segments being connected by stepped or rounded transitional areas to flat manual gripping segments and widened cross sections of the respective associated operating handle.

12. A locking system according to claim 1, wherein said lock housing includes recesses engageable with the respective locking handle notches, wherein each recess is composed of a first lower segment extending diagonally with respect to a center axis of the cylinder lock and a second circular upper segment, with a wall segment of a respective pivoted operating handle resting in use on the first segment, while the second circular segment forms a gap with respect to the second wall segment of a respective notch.

13. A locking system according to claim 3, wherein the cylinder lock is operable by means of a key.

14. A locking system according to claim 13, wherein said key is a vehicle ignition key.

15. A looking system according to claim 14, wherein said key is also operable to operate other locking devices on a vehicle.

16. A locking system according to claim 2, wherein the lock cylinder has on its lower end an eccentric which cooperates with a spring-loaded displaceable locking member, said locking member being displaceably mounted in a recess of the lock housing.

17. A locking system according to claim 3, wherein the lock cylinder has on its lower end an eccentric which cooperates with a spring-loaded displaceable locking member, which locking member is displaceably mounted in a recess of the lock housing.

18. A locking system according to claim 1, comprising cables operatively linking said movable handles with respective ones of said locking latches.

19. A convertible passenger car comprising an open passenger space, and a locking system for first and second tilting hoods disposed at opposite ends of the passenger compartment, said locking system comprising:

a first locking latch engageable with the first tilting hood and movable between a locking and an unlocking position with respect to the first tilting hood, a second locking latch engageable with the second tilting hood and movable between a locking and an unlocking position with respect to the second tilting hood, a first movable handle which is operably connected to said first locking latch such that when said first handle is in a locking position, said first locking latch is held in its locking position, and when said first handle is in an unlocking position, said first locking latch is moved to its unlocking position, a second movable handle which is operably connected to said second locking latch such that when said second handle is in a locking position, said second locking latch is held in its locking position, and when said second handle is in an unlocking position, said second locking latch is moved to its unlocking position, and a common bearing housing supporting the first and second movable handles and containing a central cylinder lock having a lock housing and a lock cylinder movable therein, wherein each of said movable handles includes a notch engageable with the lock housing of the cylinder lock with said cylinder lock and lock housing holding the handles in their respective locking positions when said cylinder lock is in a locking position and such that said handles are released from their locking positions when said cylinder lock is moved to its unlocking position.

20. A car according to claim 19, wherein said common bearing housing and movable handles are disposed in the passenger space.

21. A car according to claim 19, comprising cables operatively linking said movable handles with respective ones of said locking latches.

22. A car according to claim 21, wherein the notches of both operating handles positively abut exterior surfaces of outside walls of the lock housing to secure the operating handles in their respective locking positions when the lock cylinder is in the locking position.

23. A car according to claim 21, comprising a compression spring for pressing the lock housing towards its unlocking position, wherein the notches of both operating handles cooperate with recesses of the lock housing in such fashion that the operating handles can be pivoted to their unlocking positions when the lock housing is in said unlocking position.

24. A car according to claim 21, wherein the operating handles are located on opposite sides of an upper area of the lock housing.

25. A car according to claim 21, wherein the cylinder lock is operable by means of a key.

26. A car according to claim 25, wherein said key is a vehicle ignition key.

27. A car according to claim 26, wherein said key is also operable to operate other locking devices on a vehicle.

* * * * *